April 29, 1958  H. R. NOYES ET AL  2,832,438
SELF-ADJUSTING FLOOR BRAKE
Filed Dec. 27, 1954  3 Sheets-Sheet 1

HAZELHURST ROSS NOYES,
FRED H. LEGGE,
INVENTORS.

HUEBNER, BEEHLER,
WORREL & HERZIG,
ATTORNEYS.
BY

April 29, 1958     H. R. NOYES ET AL     2,832,438
SELF-ADJUSTING FLOOR BRAKE
Filed Dec. 27, 1954     3 Sheets-Sheet 2
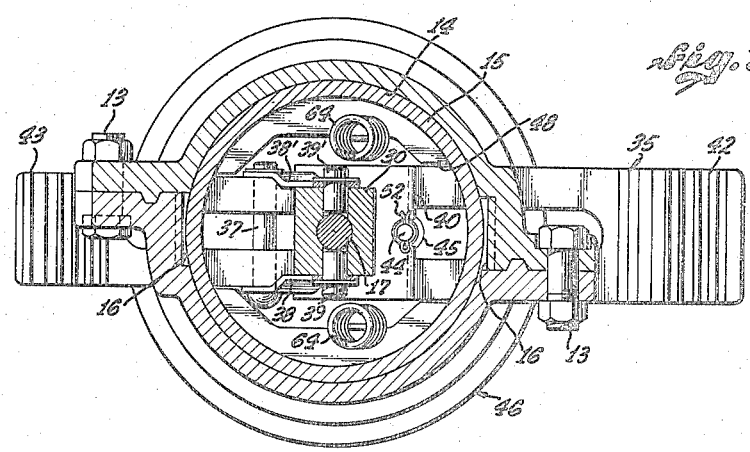
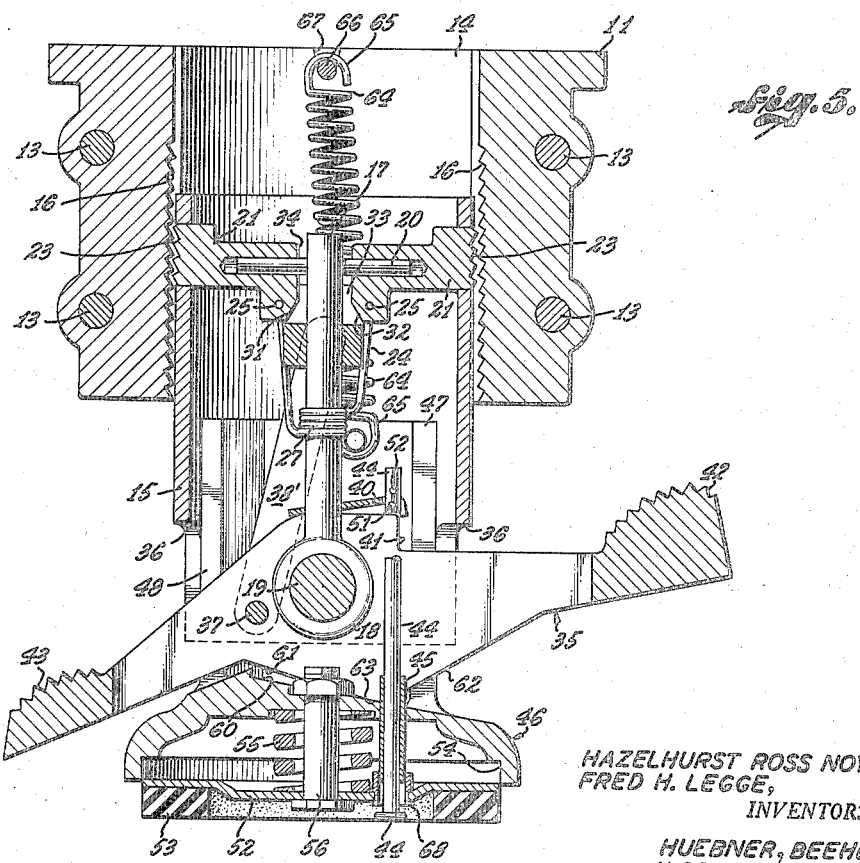
HAZELHURST ROSS NOYES,
FRED H. LEGGE,
      INVENTORS.
HUEBNER, BEEHLER,
WORREL & HERZIG,
     ATTORNEYS.

April 29, 1958 H. R. NOYES ET AL 2,832,438
SELF-ADJUSTING FLOOR BRAKE
Filed Dec. 27, 1954 3 Sheets-Sheet 3

HAZELHURST ROSS NOYES,
FRED H. LEGGE,
INVENTORS.

HUEBNER, BEEHLER,
WORREL & HERZIG,
ATTORNEYS.

United States Patent Office 2,832,438
Patented Apr. 29, 1958

2,832,438

SELF-ADJUSTING FLOOR BRAKE

Hazlehurst Ross Noyes, Hollywood, and Frederick H. Legge, La Crescenta, Calif., assignors to Aerol Co., Inc., Los Angeles, Calif., a corporation of California Application December 27, 1954, Serial No. 477,608

8 Claims. (Cl. 188—5)

The invention relates to floor brakes and has particular reference to a structure of the sort fastened to the undercarriage of trucks and dollies often employed for moving materials over a factory floor by means of which the truck or dolly can be set in a braked position while contents are unloaded and the truck reloaded or while other operations may be performed upon the load carried by the truck.

Floor brakes, as this term is commonly used, has come to mean a relatively simple, foot actuated pedestal on the bottom of a truck which can be pushed into contact with the floor or in fact any other surface upon which a truck may be rolled. In some instances the brake employs a friction pad pressed against the floor or other supporting surface often spring loaded for ease in application. In other instances the brake may involve a mechanism for pushing a pedestal or perhaps more than one pedestal against the floor with sufficient force to slightly lift the wheels of a truck from the floor so that the weight of the truck rests upon the pedestal. In either event the truck will be anchored in place by the brake and remain there reasonably secure until the brake is released and elevated out of contact with the floor.

In actual practice many types of floor surfaces are not smooth. Holes and raised spots are common. Since space beneath the bottom of the truck and the floor is often limited to a considerable degree, floor brakes need be constructed to operate with a relatively small clearance. A small clearance has several objectionable features. If the clearance is so small that the floor brake rides only a fraction of an inch above the surface, it is very apt to strike obstructions and be damaged. It may even strike raised portions of the floor surface itself. Furthermore, if there is a distinct limit to the throw of the brake for contacting the floor surface, should there be a depression at the point where the brake is to be applied, it may not be possible to push the floor brake down far enough to engage the floor.

It is therefore among the objects of the invention to provide a new and improved floor brake which is automatically adjustable so as to effectively engage the floor or other surface upon which wheels of the truck ride regardless of the roughness of the surface of the floor.

Another object of the invention is to provide a new and improved self-adjusting floor brake which is so constructed that it moves through a substantial distance between retracted position and braking position in order that the ample clearance thus provided permits removal of the brake shoe to a location where it is little likely to be damaged.

Still another object of the invention is to provide a new and improved self-adjusting floor brake which is capable of being moved to an effective position and there immediately set in braking position by manipulation of a single brake pedal in one continuous stroke.

Another object still of the invention is to provide a new and improved self-adjusting floor brake which is simple and direct in its action, positive in its grip upon the floor surface and which when it is to be released can be quickly and effectively returned to a retracted position by means of a slight pressure on a properly positioned foot pedal.

Still further among the objects of the invention is to provide a new and improved self-adjusting floor brake of such construction that it can be effectively used on a great variety of trucks and dollies, the decks of which may be at various different distances from the supporting surface.

Included among the objects further is to provide a simple and effective trip mechanism which depends upon contact with the floor surface to set it in operation, thereby enabling the automatic positioning portion of the device to be capable of use with brake shoes and brake footings of various designs.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 3 is a cross-sectional view taken on the line 3—3 of Figure 2.

Figure 5 is a longitudinal sectional view similar to Figure 2 but showing the mechanism in a second phase of operation.

Figure 1:
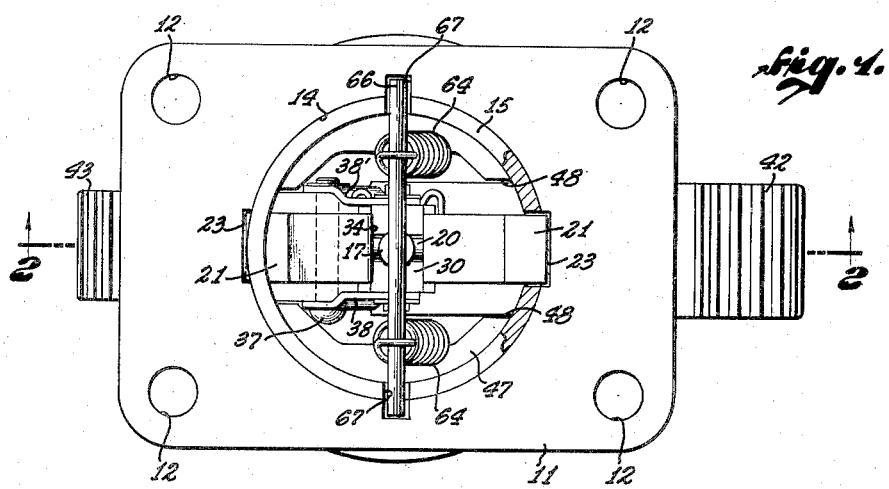
Figure 1 is a plan view of the device with a fragment broken away to show a part of the structure.

In an embodiment chosen for the purpose of illustration the floor brake is contained within a housing 10 which includes a top plate 11 having a hole 12 at each corner by means of which the housing can be attached to the underside of the deck of a truck, dolly, or comparable wheeled vehicle. Although the housing in the chosen embodiment is so constructed for attachment preferably to the under side of a horizontal surface, it will be appreciated that the manner of attachment is largely a question of mechanics and that the mechanical features of the device are permissive of other forms of attachment to other portions of a truck or dolly relatively close to the floor. The housing as a matter of convenience may be constructed in matched halves secured together by means of bolts 13.

Centrally disposed within the housing is a cylindrical bore 14 which extends through the housing in a generally vertical direction.

Cooperable with the housing is a piston assembly comprising in part a cylindrical casing 15 slightly smaller in diameter than the bore 14 to provide a smooth relatively snug sliding fit of the cylindrical casing within the bore. At the lower portion of the bore is provided a rack-like structure consisting of annular ridges 16 presenting the appearance of teeth when viewed in the longitudinal sectional view of Figure 2.

Contained within the cylindrical casing is a column 17 terminating at its lower end in an eye 18 by means of which the column is pivotally secured by a pin 19 to the lower portion of the casing. The pin attachment provides for a slight tilting movement of the column about the axis of the pin. Adjacent the upper end of the pin there is affixed a transversely extending bar 20 which protrudes out from opposite sides of the pin. The bar provides a guide for oppositely positioned clamps 21, each clamp being provided with a suitable recess 22 for reception of the appropriate end of the bar 20. It will be noted that thus mounted the clamps are adapted for reciprocating movement outwardly and inwardly along the center line of the bar 20. At the outer ends of the clamps in a series of ridges 23 conforming in spacing and size to the rack-like structure 16. The clamps are normally urged inwardly toward the center line of the column 17 by action of a specially shaped spring 24, each end 25 of which is engaged in a suitable boss 26 on the clamp 21. A coiled mid-portion 27 of the spring is designed to fit loosely around the mid-portion of the column 17.

Figure 6:
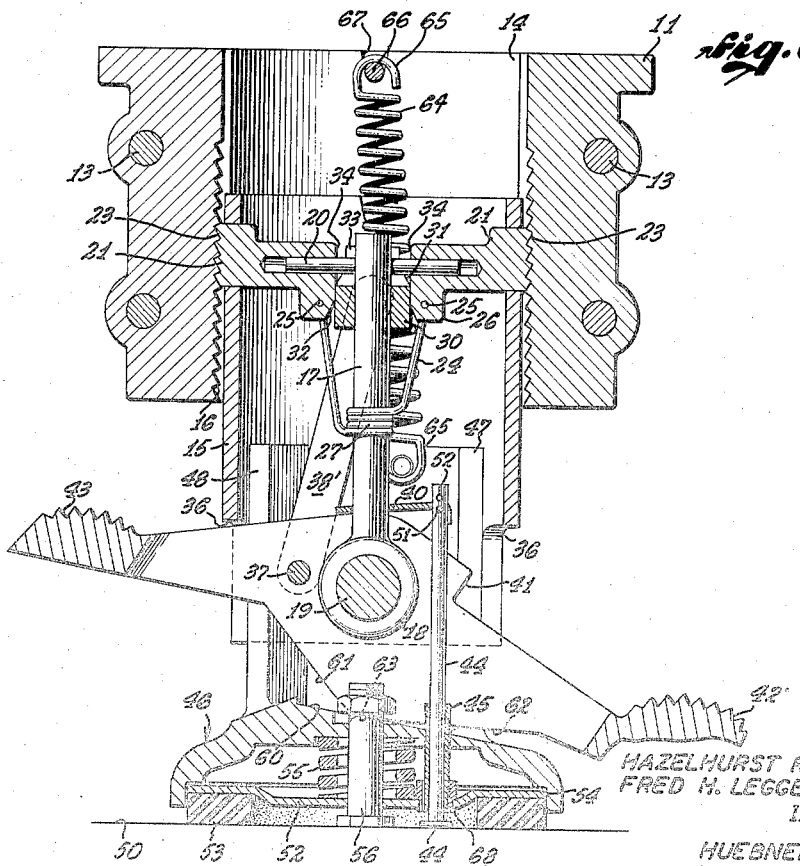
Figure 6 is a longitudinal sectional view similar to Figure 2 showing the mechanism in the position it would have when the floor brake is in contact with the supporting surface.

For forcing the clamps 21 outwardly into the positions illustrated in Figure 6, a camming device is employed. The camming device includes a fitting 30 apertured to allow it to slide freely over the column 17. The fitting has an annular cam face 31 at the upper end which is adapted to engage a corresponding cam-way 32 at the inner portion of the bosses 26. A pilot knob 33 is adapted to be normally located within a space between inner end faces 34 of the clamps 21. Hence the spring 24 can withdraw the clamps inwardly a distance limited by engagement of the end faces 34 with the pilot knob 33. A pedal lever 35 having opposite ends of substantially equal length is pivotally mounted upon the pin 19 for tilting movement in a vertical plane. Cut-out portions 36 at the lower end of the cylindrical casing 15 allow for movement of the pedal lever.

Off center with respect to the axis of the pin 19 is a pin 37 by means of which links 38 and 38′ are secured to the pedal lever 35. At their upper ends the links 38, 38′ are pivotally secured to stub shafts 39, 39′, seen to good advantage in Figure 3. The stub shafts are secured to the fitting 30 so that when the pedal lever 35 is tilted clockwise, as viewed in Figures 2 and 5, the links 38, 38′ are moved upwardly. This causes the fitting 30 to move upwardly and push the cam face 31 against the cam-ways 32, thereby to shift the clamps outwardly against tension of the spring 24.

Figure 2:
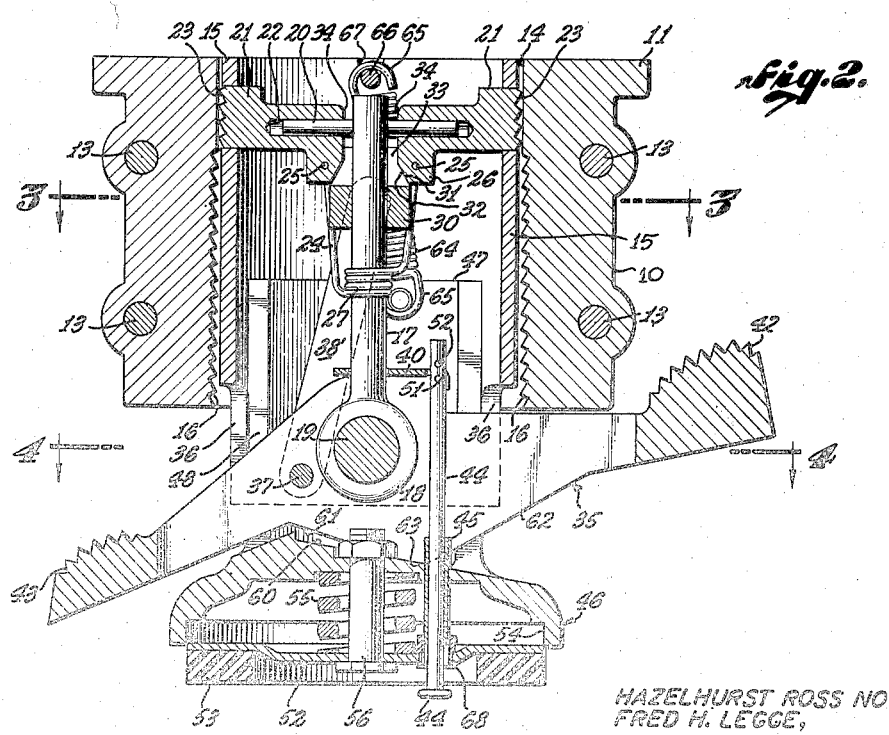
Figure 2 is a longitudinal sectional view taken on the line 2—2 of Figure 1.
Figure 4:
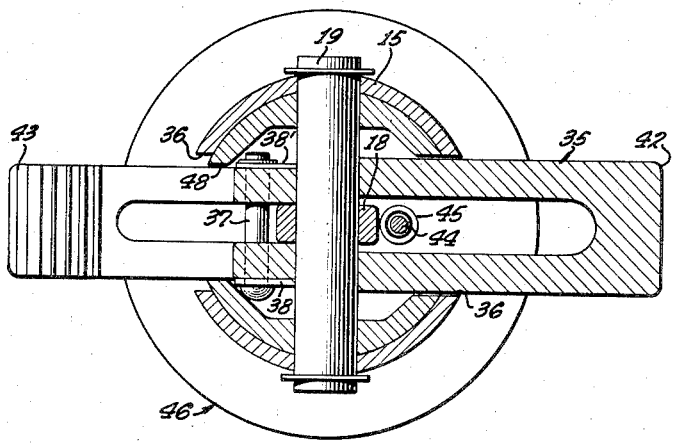
Figure 4 is a cross-sectional view taken on the line 4—4 of Figure 2.

As indicated in Figure 2, the pedal lever 35 is initially and normally locked against pivotal movement by means of a hook 40, the outer end of which overlies a shoulder 41 of the pedal lever. The hook as shown encircles and is held by the lower end of the column 17. A brake depressor pedal 42 is affixed to the right-hand end of the pedal lever as viewed in Figure 2 and a brake reliever pedal 43 is affixed to the left-hand end. When the hook 40 is engaged with the shoulder 41 the pedal lever 35 will not tilt when depressed by foot pressure upon the brake depressor pedal 42. Instead the entire pedal lever as a unit together with the cylindrical casing will be moved downwardly within the bore 14. This will shift the piston assembly downwardly to approximately the position shown in Figure 5.

For releasing the hook there is provided a trip rod 44 slidably mounted in a sleeve 45. The sleeve 45 in turn is secured to a foot-piece 46. The foot-piece includes a hollow shaft 47 which extends upwardly and is slidably received within the interior of the cylindrical casing 15. The hollow shaft is composed of opposite side pieces separated by vertical extending recesses 48 within which the pedal lever is adapted to tilt. When the brake depressor pedal 42 is pushed down until the lower end of the trip rod 44 strikes a supporting surface 50, the trip rod is moved upwardly. A pin 51 then engages the underside of the hook 40 moving it out of engagement with the shoulder 41. A similar pin 52 overlies the top side of the hook 41 to properly confine the hook in its engagement with the trip rod.

After the hook has been thus disengaged, continued downward pressure upon the brake depressor pedal 42 tilts the pedal lever clockwise as viewed in Figures 2 and 5. As the pedal lever presses outwardly upon the pin 37 and the links 38, 38′, the fitting 30 is moved upwardly, moving the clamps 21 outwardly until they reach the position illustrated in Figure 6. In that position ridges 23 engage the elements of the rack-like structure 16. This fixes the position of the piston assembly relative to the housing.

At the bottom of the foot-piece 46 is a ground plate 52 having an annular friction pad 53 attached to the lower surface. A recess 54 is adapted to slidably receive the ground plate 52. A heavy compression spring 55 secured by means of a bolt 56 between the ground plate 52 and the interior of the foot-piece 46 serves normally to extend the ground plate downwardly to the position shown in Figure 2.

It will be noted further that there is provided an upwardly facing cam-way 60. As viewed in Figures 2, 5 and 6 the cam-way is tilted slightly with the low end at the right. The cam-way is located at that portion of the foot-piece where the hollow shaft 47 adjoins the lower curved portion. The pedal lever is provided with two cam-way contacting faces 61 and 62. At the junction of these two faces is provided a transversely extending ridge 63 which may be designated as a cam adapted to slide along the cam-way 60. In retracted position the cam-way contacting face 61 lies adjacent the cam-way but need not necessarily be in contact with it. A pair of coiled springs 64 serve to hold the brake parts in this retracted position. Each coiled spring is secured by an appropriate spring hook 65 to the hollow shaft 47 at the lower end of the spring. A bar 66 secured at its opposite ends in the housing 11 serves as a means for hanging the upper ends of the coiled springs 64. Appropriate recesses 67 are provided in the wall of the cylindrical casing 15 for clearance of bar 66.

A bushing 68 secured in the ground plate 52 serves to slidably receive the sleeve 45 which in turn mounts the trip rod 44.

After the brake depressor pedal 42 has been stepped on to shift the mechanism from the position shown in Figure 2 to the position shown in Figure 5 against tension of the coiled springs 64, and the hook 40 has been disengaged as previously described, continued pressure upon the brake depressor pedal 42 will force the cam 63 against the sloping surface of the cam-way 60. Since the piston assembly has already been fixed in its position, as shown in Figure 6, by extension of the clamps 21, pressure of the cam 63 on the cam-way 60 depresses the foot-piece 46. After the friction pad 53 has been pressed into contact with the surface 50, continued pressure of the cam serves to compress the spring 55. The downward movement of the brake depressor pedal 42 may be limited as shown by full engagement of the clamps 21 with the cylindrical bore or if the adjustment be somewhat free, until the cam-way engaging face 62 lies flat against the cam-way 60. Energy stored in the spring 55 will hold the friction pad against the surface and thus cause the braking action. This will occur without the necessity of lifting the wheels of the cart, dolly or truck from the floor.

When it is desired to release the brake, the brake reliever pedal 43 is stepped on moving it downwardly. This tilts the pedal lever 35 counter-clockwise, as viewed in Figures 6, 5 and 2. Counter-clockwise movement will continue until first the cam 63 moves to the end of its point of contact with the cam-way 60. This movement will be sufficient to relieve tension on the spring 55. A portion of the same counter-clockwise movement moves the links 38, 38′ downwardly, withdrawing the cam face 31 from engagement with the cam-ways 32 as the fitting 30 moves downwardly, pulled by the links 38, 38′. Simultaneously the energy stored in spring 24 will withdraw the clamps from their engagement with the rack-like structure on the interior of the bore 14. This action will take place very rapidly and release the brake from contact with the floor accompanied almost simultaneously by movement of the entire piston assembly upwardly to the upper limit of its position. Full clearance between the surface 50 and the foot-piece in its retracted position will be promptly achieved.

Further still, when the brake reliever pedal has been pushed to its lowermost position, the shoulder 41 will be returned to the position wherein the weight of the trip rod 44 and hook 40 will return the hook downwardly to its position overlying the shoulder. The mechanism is then ready for the next braking operation.

It will become apparent from an understanding of the structure and operation of the self-adjusting floor brake that the piston assembly will be engaged in a fixed position relative to the housing whenever the lower end of the trip rod strikes the supporting surface. This will be true whether there is a bump or a hollow at the time of striking. If it be a hollow, the piston assembly will be engaged at a higher location within the housing. Contrarily if the surface has a hollow at the location of application of the floor brake, the piston assembly will become engaged at a lower position within the housing. In either event after the piston assembly has been thus fastened in the housing, the foot-piece will be moved to at floor-engaging position and effectively brake the vehicle.

There has accordingly been described herein a simple, effective, and rapid acting self-positioning device which by one simple downward pressure of the foot upon an appropriate pedal sets the brake firmly but in a position from which it can be as readily released.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A self-adjusting floor brake comprising a housing having a vertically extending bore, a piston assembly including a casing slidably mounted in said bore and having different vertical positions in said bore, mutually engageable clamping means respectively on the casing and on the wall of said bore having engaged and disengaged positions, said clamping means being engageable at different positons of said casing in said bore, said piston assembly including a foot-piece having a floor contacting surface at the bottom thereof and having a vertical shaft slidably mounted upon the lower end of the casing, a combined brake depressor and brake reliever pedal tiltably mounted on the piston assembly, an extender located between the clamping means on said casing and movably secured to the pedal, said pedal including a depressing means for the foot brake operably mounted intermediate the foot-piece and the casing, a trip interconnected between said pedal and said piston assembly having a first position inhibiting operation of both said extender and said depressing means, said trip having a second position effecting release successively of the extender and the depressing means upon contact with the floor whereby the piston assembly is first secured in position relative to the floor by said clamping means and the foot-piece is subsequently pressed into contact with the floor by said depressing means, and means acting between the foot-piece and the housing for releasing said foot-piece from the floor.

2. A self-adjusting floor brake comprising a housing having a vertically extending bore, a piston assembly including a casing slidably mounted in said bore and having different vertical positions in said bore, mutually engageable clamping means respectively on the casing and on the wall of said bore engageable at different positions of said casing in said bore, said piston assembly including a foot-piece having a floor contacting surface at the bottom thereof and having a shaft slidably mounted in a vertical direction upon the lower end of the casing, a combined brake depressor and brake reliever pedal tiltably mounted on the piston assembly, an extender located operatively between the clamping means on said casing and secured to the pedal, a foot-piece depressing means inteconnected between the foot-piece and the casing, a trip operatively interconnected with said extender and with said depressing means having a first position inhibiting operation of both said clamp extender and said depressing means, said trip having a second position effecting release successively of the extender and the depressing means upon contact with the floor whereby said clamping means first secures the piston assembly first secured in a set position relative to the floor and thereafter the foot-piece is pressed into contact with the floor, said pedal being adapted to be actuated in a different direction for re-engaging the trip whereby to release the foot-piece from the floor and whereby to withdraw said extender to release position, said piston assembly in released position of the extender being reelased for elevation within the bore.

3. A self-adjusting floor brake comprising a housing having a vertically extending bore, a piston assembly including a casing slidably mounted in the bore for movement to different vertical positions, and a foot-piece slidably mounted in a vertical direction on the piston and extending therebelow, clamp elements respectively on the wall of the bore and on the casing, said clamp element on the casing being mounted transversely on the casing and adapted to engage said clamp element on the bore at a selected one of said positions of the casing relative to the bore, a pedal tiltably mounted on the piston assembly, and a link between the pedal and the clamp element on the casing adapted upon tilting of the pedal to extend said clamp element of the casing, and spring means attached to the clamp element of the casing biased normally to retract said last clamp element to an unclamped position, and trip means on the piston assembly normally in engagement with said pedal in a position inhibiting rotation of the pedal and having another position releaesd from contact with said pedal by contact of the trip means with a floor surface.

4. A self-adjusting floor brake comprising a housing having a vertically extending bore, a piston assembly including a casing slidably mounted in the bore and having different vertical positions in said bore, a piston in said casing and a foot-piece slidably mounted on the piston and extending therebelow, clamp elements respectively on the wall of the bore and on the casing, the clamp element on the casing being mounted for movement transversely on the casing and adapted to engage said clamp element on the bore at any one of said different vertical positions of the casing relative to the bore, a pedal tiltably mounted on the piston assembly for movement in a vertical plane, and a link between the pedal and said clamp element on the casing having an engagement with said clamp element of the casing in tilted position of the pedal extending said clamp element of the casing into engagement with the clamp element of the bore, and spring means attached to the clamp element on the casing biased normally to retract said last clamp element, trip means on the piston assembly having a position normally inhibiting rotation of the pedal and having another position released from the pedal by contact with a floor surface, and a depressing means for the foot-piece from the pedal between the pedal and the foot-piece adapted to press the foot-piece against the floor when said trip is in said other position.

5. A self-adjusting floor brake comprising a housing having a vertically extending bore, a piston assembly including a casing slidably mounted in the bore and a piston in the casing, said casing having different vertical positions in said bore, and a foot-piece slidably mounted on the piston and extending therebelow, rack elements on the wall of the bore, oppositely extendible clamps mounted transversely in the casing having extended positions in engagement with said rack elements at any of said different vertical positions of the casing in the bore, a cam insertible between inner ends of said clamps, a pedal tiltably mounted on the piston assembly, and a link between the pedal and the cam adapted upon tilting of the pedal to move said clamps to said extended positions, spring means attached to the clamps biased normally to retract the clamps from said extended positions, trip means on the piston assembly adapted to engage a floor surface and normally having a position of engagement with the pedal inhibiting tilting of the pedal, said trip means having a position released from the pedal when the tilt means is moved into contact with a floor surface, and means between the pedal and the foot-piece having a position pressing the foot-piece against the floor upon release of said trip.

6. A self-adjusting floor brake comprising a housing having a piston assembly including a casing slidably mounted upon the housing to different positions, mutually engageable clamping means respectively on the casing and the housing engageable at said different positions of said piston assembly on said housing, a foot-piece having a floor contacting plate movably mounted at the bottom thereof and a spring between the plate and the foot-piece normally extending said plate downwardly, a pedal lever tiltably mounted on the piston assembly having a brake depressor pedal at one end and a brake reliever pedal at the other end, cam faces respectively on the pedal lever and on the foot-piece adapted when the depressor pedal is depressed to extend said foot-piece toward a floor surface, means connected between the pedal lever and the clamping means which is on the piston assembly and having a position of engagement with the mutually engageable clamping means when the pedal lever is tilted, a catch on the piston assembly normally having a position of engagement with the pedal lever thereby to inhibit tilting, a trip connected to the catch and reciprocatably mounted on the piston assembly and extendible downwardly therefrom, said trip being adapted upon engagement with a floor surface to release said catch, said pedal lever having a position upon depression of the brake reliever pedal tilted to a position of re-engagement with the catch, and means acting between the housing and the piston assembly adapted to return the assembly to a location removed from the floor surface.

7. A self-adjusting floor brake comprising a housing having a vertically extending bore, a piston assembly including a casing slidably mounted in the bore to different vertical positions, mutually engageable clamps respectively on the casing and in said bore, said clamps being subject to relative transverse movement to a position of engagement at any of said different vertical positions of said piston assembly in said bore, said piston assembly including a foot-piece having a floor contacting plate movably mounted at the bottom thereof and a spring normally between the foot-piece and the plate extending said plate in a downward direction, a pedal lever tiltably mounted on the piston assembly having a brake depressor pedal at one end and a brake reliever pedal at the other end, cam faces respectively on the pedal lever and on the foot-piece having a position when the depressor pedal is depressed extending said foot-piece toward a floor surface, means connected between the pedal lever and the clamps on the piston assembly and having a position of engagement with the clamps on the piston assembly whereby to move said clamps to said position of engagement when the pedal lever is tilted, a hook on the piston assembly normally engaging the pedal lever thereby to inhibit tilting, a trip connected to the hook and reciprocatably mounted on the foot-piece and extendible downwardly therefrom, said trip having a position upon engagement with a floor surface effecting release of said hook, said pedal lever in depressed position of the brake reliever pedal being tilted to a position of re-engagement with the hook, and spring means between the housing and the piston assembly adapted to return the piston assembly to a location removed from the floor surface.

8. A self-adjusting floor brake comprising a housing having a vertically extending bore, a piston assembly including a casing slidably mounted in said bore and having different vertical positions in said bore, mutually engageable clamping means respectively on the casing and on the wall of said bore having engaged and disengaged positions, said clamping means being engageable at said different positions of said casing in said bore, said piston assembly including a foot-piece having a floor contacting surface at the bottom thereof and having an upwardly extending portion in endwise sliding engagement with the lower end of the casing, a brake depressor operatively associated with and tiltably connected to the foot-piece for movement in a vertical plane, an extender engaging respectively at least one of said clamping means and the brake depressor, said brake depressor including depressing means for the foot-piece connected between the foot-piece and the brake depressor, a trip on said piston assembly engageable with said depressing means, said trip having a first position wherein said extender and said depressing means are blocked from operation and a released position wherein the extender and the depressing means are released, whereby said extender is moved into engagement with said one clamping means securing the piston assembly in fixed position relative to the floor and the foot-piece is pressed into contact with the floor, said brake depressor being movable to a position releasing pressure of said foot-piece upon the floor.

References Cited in the file of this patent

UNITED STATES PATENTS

| | | |
|---|---|---|
| 2,236,281, | Anderson | Mar. 25, 1941 |
| 2,360,874 | Herold | Oct. 24, 1944 |